US010019666B2

(12) United States Patent
Kirkwood Azmat et al.

(10) Patent No.: US 10,019,666 B2
(45) Date of Patent: Jul. 10, 2018

(54) COUNTING BAR-SHAPED PRODUCTS BASED UPON ACQUIRED IMAGES (71) Applicant: PRIMETALS TECHNOLOGIES GERMANY GMBH, Erlangen (DE)

(72) Inventors: Ruth Kirkwood Azmat, Jefferson, MA (US); Christopher Ceccarini, Worcester, MA (US); Ritesh Manoria, Maharashtra (IN)

(73) Assignee: PRIMETALS TECHNOLOGIES GERMANY GMBH (DE)

( * ) Notice: Subject to any disclaimer, the term of this patent is extended or adjusted under 35 U.S.C. 154(b) by 538 days.

(21) Appl. No.: 14/643,914

(22) Filed: Mar. 10, 2015

(65) Prior Publication Data
US 2016/0267374 A1 Sep. 15, 2016

(51) Int. Cl.
*G06M 7/04* (2006.01)
*H04N 5/225* (2006.01)
*H04N 7/18* (2006.01)
*G06M 7/00* (2006.01)
*G06M 1/10* (2006.01)

(52) U.S. Cl.
CPC .............. *G06M 7/04* (2013.01); *G06M 1/101* (2013.01); *G06M 7/00* (2013.01); *H04N 5/2252* (2013.01); *H04N 5/2253* (2013.01); *H04N 7/183* (2013.01)

(58) Field of Classification Search
CPC .......... G06M 1/101; G06M 7/00; G06M 7/04; H04N 5/2252; H04N 5/2253; H04N 7/183
USPC .......................................................... 348/86
See application file for complete search history.

(56) References Cited

U.S. PATENT DOCUMENTS

2005/0147289 A1* 7/2005 Kodama ............. B21C 37/0811
382/152

FOREIGN PATENT DOCUMENTS

| CN | 10912899 A | * 12/2010 | ............... G06K 9/00 |
| CN | 101912899 A | 12/2010 | |
| WO | WO 01/33204 A1 | 5/2001 | |
| WO | WO 0133204 A1 | * 5/2001 | ......... G01N 21/8901 |

OTHER PUBLICATIONS

CN 10912899 (A) (english Machine Translation) Bar Counting Method and Device.*
International Search Report and Written Opinion, dated Jun. 3, 2016, issued in corresponding International Application No. PCT/EP2016/054815. Total 12 pages.

* cited by examiner

*Primary Examiner* — William C Vaughn, Jr.
*Assistant Examiner* — Naod Belai
(74) *Attorney, Agent, or Firm* — Ostrolenk Faber LLP (57) ABSTRACT

A conveyor element (2) of a conveyor device conveys bar-shaped products (1) orthogonal to a longitudinal direction (x) of the bar-shaped products (1) oriented in a conveying direction (y). A trigger device (3) provides a trigger signal (S) each time the conveyor element (2) has travelled a predetermined interval. Based upon the respective trigger signal (S), an image (B) is acquired by a camera (4). The image (B) shows front ends of the products (1) in a respective section of the conveyor element (2) corresponding at least to the predetermined interval. Based upon the acquired images (B), the number of bar-shaped products (1) conveyed by the conveyor element (2) is determined.

17 Claims, 4 Drawing Sheets

COUNTING BAR-SHAPED PRODUCTS BASED UPON ACQUIRED IMAGES

TECHNICAL FIELD OF THE INVENTION

The present invention concerns a method of operation for a conveyor device for conveying bar-shaped products,
wherein the bar-shaped products are conveyed by a conveyor element in a conveying direction orthogonal to a longitudinal direction of the bar-shaped products.

The present invention further concerns a conveyor device for conveying bar-shaped products,
wherein the conveyor device comprises a conveyor element conveying the bar-shaped products in a conveying direction orthogonal to a longitudinal direction of the bar-shaped products.

BACKGROUND OF THE INVENTION

Such a method of operation and the corresponding conveyor device are known to the person skilled in the art.

After rolling of bar-shaped products, the products are cooled down on a cooling bed of a rolling mill. Afterwards, groups of products are strapped into bundles. The bundles are then sent to storage or directly to a customer. It is important to know the number of products in the respective bundles, e.g. for purposes of tracking material or for satisfying customer orders.

In the conveyor devices of the prior art, counting of the products is achieved by mechanical counting devices. Mechanical counting devices are relatively slow and unreliable. Furthermore, they are subject to wear.

SUMMARY OF THE INVENTION

It is an object of the present invention to be able to count products in a reliable manner especially with minimal mechanical modifications required if implemented on existing equipment.

According to the present invention, a method of operation of the above-mentioned type is augmented by the features,
that a respective trigger signal is provided by a trigger device each time a conveyor device has traveled a predetermined interval,
that based upon the respective trigger signal, an image is acquired by a camera, said image showing front ends of the products in a respective section of the conveyor element corresponding at least to said predetermined interval, and
that based upon the acquired images, the number of bar-shaped products conveyed by the conveyor element is determined.

Due to the triggered acquisition of the images and the processing of the images in a reliable way, determination of conveyed bar-shaped products can be achieved.

If the acquired images show the bar ends in a section of the conveyor element corresponding exactly to said predetermined interval, the utilisation of this method of triggering enables the acquired images themselves to be exactly, without gaps and overlaps, chronologically sequenced and thereby ensuring that products are detected exactly once, that is neither zero times nor more than once. If the acquired images show the bar ends in a section of the conveyor element corresponding to more than said predetermined interval, a window within said images has to be defined, a width of said window corresponding exactly to said predetermined interval. In this case, by restricting evaluation of the acquired images to the respective window, the same result can be achieved as if the images themselves would correspond exactly to said predetermined interval.

Orientation of the camera is preferably such that the optical axis of the camera and the longitudinal direction make just a relatively small angle and that an opening angle of the imaging (that is the relation between length of the section seen in conveying direction and the distance of the camera from the front ends of the products) is as small as reasonably possible. By this design the possibility is avoided that the front end of one of the products is blocked by another of the products from being seen by the camera. Further, distortions in the image which might occur at the boundaries of the respective section are minimised.

The respective section may, seen in the conveying direction, correspond 1:1 with the complete image acquired by the camera. Alternatively, seen in the conveying direction, there may be a predefined image area (=window). In that case, the respective section of the conveyor element corresponds 1:1 with the width of the predefined window.

Preferably, the front ends of the products in the respective section of the conveyor element are illuminated by a light source. By this embodiment, the image contrast and consequently the reliability of detection may be improved. This is true especially in case the light source emits light within a specified wavelength range and the light provided to the camera is filtered by a filter matched to the specified wavelength range.

The selection of the wavelength of the light emitted by the light source is application dependent. For instance, in situations where variations in ambient light, such as sunlight, causes variations in the contrast of acquired images, it is often advantageous that the light source emits light within a narrow band of the red light spectrum—around 635 nm. This allows ambient wavelengths of light, such as sunlight, to be filtered out to remove such variations. Such variations may be substantial over 24 hours.

For determining the time points at which a respective trigger signal is provided several embodiments are possible.

For example, a measuring device may measure continuously a conveying speed of the conveyor element. In that case, the detected conveying speed is provided to the trigger device. The trigger device is in that case issuing the trigger signals according to the detected conveying speed. The measuring device advantageously works contactless. For example, the measuring device may be a laser measuring device. The speed measurement may be based on the Doppler effect.

Alternatively, trigger marks may be positioned on the conveyor element or on an auxiliary structure which moves together with the conveyor element in equidistant intervals. In that case, the trigger device comprises a sensor detecting the presence of a trigger mark at a predetermined location. Detection of the presence of a respective trigger mark triggers outputting a respective trigger signal. The sensor may be a proximity sensor, for example. Preferably, the trigger signal is output immediately upon detection of the presence of a trigger mark. Alternatively, the trigger signal may be output after a predetermined delay time after detection of the presence of a trigger mark.

In some embodiments of the present invention, separators separating groups of products from each other may be positioned on the conveyor element or on an auxiliary structure which moves together with the conveyor element in equidistant intervals. In that case, the issuing of the trigger signals is matched to the locations of the separators such that the section of the conveyor element, seen in conveying direction, is terminated on both sides by such a separator.

The match may be especially such that between the separators terminating the detected section, there is no other separator.

In case trigger marks are used for triggering, the trigger marks may be identical with the separators. The detected trigger mark which triggers the respective trigger signal may be, however, another separator than the separators terminating the corresponding detected section of the conveyor element.

The detected sections may overlap. Such an embodiment complicates the evaluation of the images, however. Preferably, therefore, the acquired images, seen in the conveying direction, each correspond with one interval. In case a window is defined within the acquired images, the width of the window seen in the conveying direction corresponds with one interval. Consequently, the sections of the conveyor device acquired by the images seen in the conveying direction border each other without overlap.

The image processing, such as binarization, is required. Each pixel of the images, therefore, is checked as to whether the grey value of the respective pixel is above or below a predetermined threshold. If the grey value of the respective pixel is above the threshold, the binary value of the respective pixel is set to 1. Otherwise, the binary value is set to 0. Based upon the binarization, further processing steps may be implemented.

For example, in the images, dark holes may be determined. Dark holes are single pixels or groups of pixels which all have the value 0 but are surrounded completely by pixels having the value 1. The pixels of dark holes are set to 1 in the image processing. Next, small structures of bright pixels are removed from the images. Bright pixels are pixels having the value 1. Small structures are single pixels or groups of pixels completely surrounded by dark pixels with the additional condition that a size of the respective small structure—e.g. the total number of pixels of the respective small structure—is below a predetermined value.

This method is applied preferably if the separators terminating the respective sections are provided. The method is, however, also applicable if the separators are not provided. Preferably, this type of image processing is executed individually for the respective image.

Counting of bars can be done by one of two methods. In the first method, a pattern matching an algorithm which is set up to recognise the shape and size of a single bar-shaped product, essentially as described above, is implemented. In the second method, in the images, simply the bright pixels may be counted and the accumulated total of bright pixels may be divided by a standard number. The standard number is the number of pixels which should be found for a single bar-shaped product. This method may be executed independently of whether the separators are provided or not. If the separators are provided, the method is executed preferably individually for the respective image. If the separators are not provided, the method may be executed either individually for the respective image or over several images. The last version is preferred. In this case, there is preferably a carrying over of a part of found bar-shaped products into the next evaluated image.

According to the present invention, a conveyor device of the above-mentioned type is augmented by the features,
that the conveyor device comprises a trigger device providing a respective trigger signal each time the conveyor element has traveled a predetermined interval,
that the conveyor device comprises a camera acquiring an image, based upon the respective trigger signal. The image showing front ends of the products in a respective section of the conveyor element corresponding at least to said predetermined interval, and
that the conveyor device comprises a processing device that determines based upon the acquired images the number of bar-shaped products conveyed by the conveyor element.

The preferred embodiments of the conveyor device correspond essentially with the preferred embodiments of the method of operation. Therefore, reference is made to the explanations above.

The camera is preferably positioned on a mounting in an adjustable manner. Therefore, the camera may be adjusted and oriented as required so that it is directed to the section of the conveyor element to be detected in an optimal way. Especially, an adjustment may be possible both in the longitudinal direction of the bar shaped products and in the conveying direction and further also orthogonal to these two directions. Adjustability may be in steps or continuously.

If one is provided, the light source emits most of its light in a direction of a main illumination direction. Preferably, the main illumination direction and the optical axis of the camera make an angle which is divided by the longitudinal direction of the products more or less symmetrically. The light source may be in a manner similar to the camera mounted on adjustable brackets.

If the presence of trigger marks is to be detected by means of a sensor, the sensor mounting should be adjustable. Adjustability should be possible particularly as referred to the local direction of movement of the trigger marks near the sensor in the direction of the local direction of movement. This design makes it only necessary to adjust the sensor once so that the sensor detects the presence of a trigger mark at the exactly correct time. Adjustment would be implemented during commissioning of the conveyor device.

BRIEF DESCRIPTION OF THE DRAWINGS

The features, properties and advantages of the present invention will be understood more easily by the following description of preferred embodiments which are explained in combination with the drawings. In the attached drawings.

DESCRIPTION OF EMBODIMENTS

Figure 1:
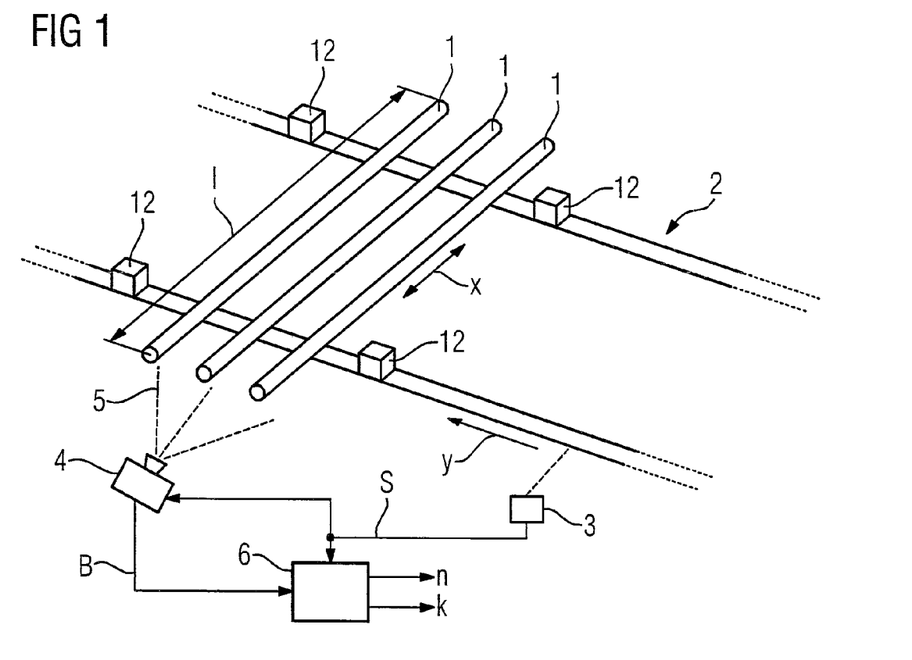
FIG. 1 shows a conveyor device for conveying bar-shaped products.

As shown in FIG. 1, bar-shaped products 1 shall be are conveyed by a conveyor device. The bar-shaped products 1 extend in a longitudinal direction x over a length l. The longitudinal direction x usually is horizontal. The length l usually is in the range of several meters, for example between 3 m and 15 m, especially between 4 m and 12 m.

The bar-shaped products 1 often have a circular cross-section with a diameter of at least 8 mm and up to 120 mm. The products 1 may, however, have a non-circular cross-section, for example a square, angle or hexagonal cross-section.

Figure 2:
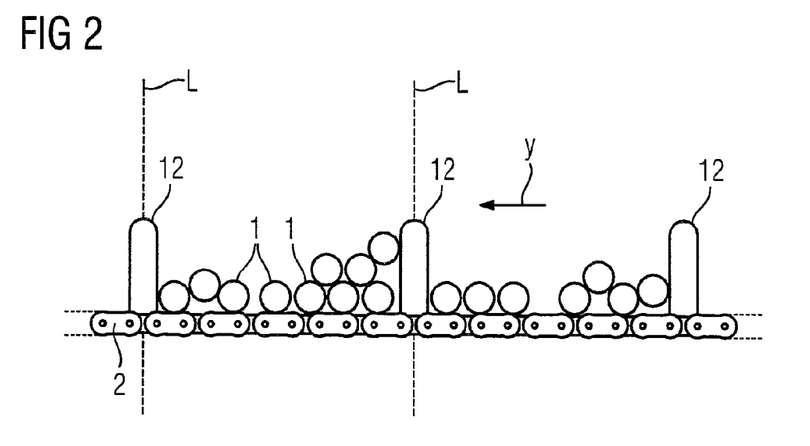
FIG. 2 is a side view of a section of a conveyor element of the conveyor device of FIG. 1.

For conveying the products 1, the conveyor device comprises a conveyor element 2. The conveyor element 2 may be, for example, as shown in FIG. 2, an endless circulating chain. The conveyor element 2 conveys the products 1 in a conveying direction y. The conveying direction y is orthogonal to the longitudinal direction x. Usually it is horizontal.

As shown in FIG. 1, the conveyor device further comprises a trigger device 3. The trigger device 3 triggers at certain times a respective trigger signal S. Especially, the trigger signal S is output each time the conveyor element 2 has travelled a predetermined interval. Therefore, a trigger signal S is provided each time the conveyor element 2 has conveyed the products 1 by a predetermined distance of for example 10 cm or 20 cm (or another appropriate value). This is more clearly explained below.

The respective trigger signal S may be provided, as shown in FIG. 1, for example to a camera 4 of the conveyor device. In this case, the respective trigger signal S may cause, for example, a camera 4 to acquire a respective image B. The trigger signal S therefore triggers the acquisition of the respective image B by the camera 4. The acquired image B shows front ends of the products 1 within a respective section of the conveyor element 2, for example the section of the conveyor element 2 terminated in FIG. 2 by the vertical lines L. The camera 4 is preferably positioned such that an optical axis 5 of the camera 4 makes a reasonably small angle with the longitudinal direction x. This embodiment avoids front ends of products 1 being blocked by other products 1.

The respective acquired image B is, as shown in FIG. 1, provided to a processing device 6 of the conveyor device. The processing device 6 may be, as shown in FIG. 1, a separate device. Alternatively, it may be integrated into the camera 4. The processing device 6 determines, based upon the detected images B, the number of products 1 conveyed by the conveyor element 2. In the simplest case, single images B are evaluated. In this case, for each image B, a natural number n is determined whereby the natural number n corresponds with the number of products 1 detected in the respective image B. Alternatively, a combined evaluation of a plurality of images B may be implemented. In this case, there may be determined for example for each image B a number k corresponding with the number of products 1 detected in the respective image B. The number k may be a rational number which not necessarily is a natural number. Possible ways of implementation will be explained below.

Alternatively to providing the trigger signal S to the camera 4, the respective trigger signal S may be provided to the processing device 6. In this case images B are acquired by the camera 4 and provided to the processing device 6 continuously. In this case, however, the images B are accepted by the processing device 6 for evaluation only if a trigger signal S is provided to the processing device 6 by the trigger device 3.

Figure 3:
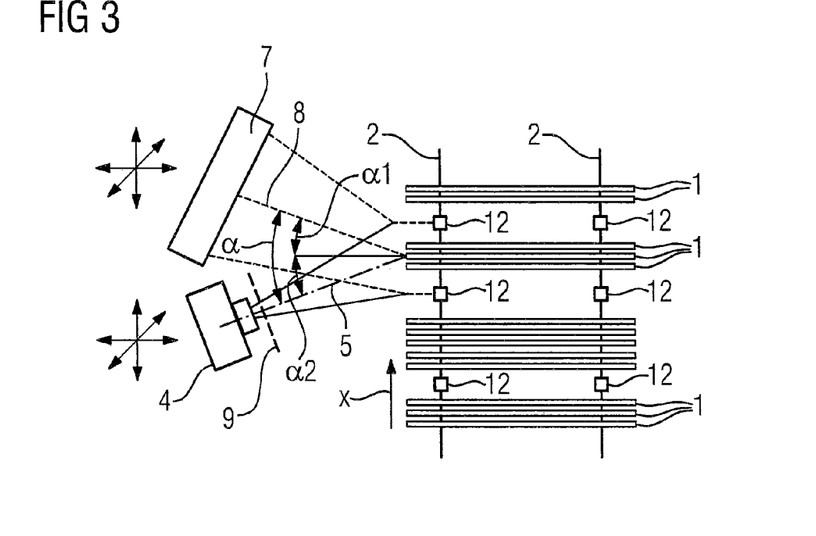
FIG. 3 is a top view of a section of a conveyor element of the conveyor device of FIG. 1.

In the simplest case, there is simply a detection of the images B based upon the natural illumination (ambient light) present in the environment. As shown in FIG. 3, however, the conveyor device preferably comprises a light source 7 which illuminates the respective section of the conveyor element 2 and the front ends of the products 1 in the respective section of the conveyor element 2.

The light source 7 has a main illumination direction 8, i.e. a direction in which the light source 7 illuminates most strongly. Preferably, the orientation of the camera 4 and of the light source 7 are matched to each other such that the optical axis 5 and the main illumination direction 8 make an angle α. The angle α is preferably parted by the longitudinal direction x more or less symmetrically. Considering the front ends of the products 1 as a "mirror" in the optical sense, a first partial angle α1 made by the main illumination direction 8 and the longitudinal direction x therefore corresponds to an angle of incidence of a light beam emitted by the light source 7 in the main illumination direction 8. Analogously, in this case, a second partial angle α2 made by the optical axis 5 and the longitudinal direction x corresponds to an angle of reflection of such a light beam.

The camera 4 and the light source 7 are usually positioned on brackets (not shown in the drawings). Preferably, they are furthermore positioned within protective housings (also not shown in the drawings). The position of the camera 4 and/or the position of the light source 7 may be fixed. Preferably, however, the camera 4 and/or the light source 7 are positioned on the brackets in an adjustable manner. This is indicated in FIG. 3 by arrows placed near the camera 4 and the light source 7. Adjustability may be continuously or in steps.

Preferably the light source 7 emits light within a specified wavelength range, i.e. light which comprises only wavelengths within a partial area of the spectrum visible for humans. For example, the light source 7 may emit light whose wavelength is in the range of about 635 nm, e.g. between 620 nm and 650 nm (red light). The emitted light may be—but not necessarily is—monochromatic. In case the light source 7 emits light within the specified wavelength range, light entering the camera 4 is filtered by a filter 9. The filter 9 is in this case arranged in front of the camera 4 and matched to the specified wavelength range.

Figure 4:
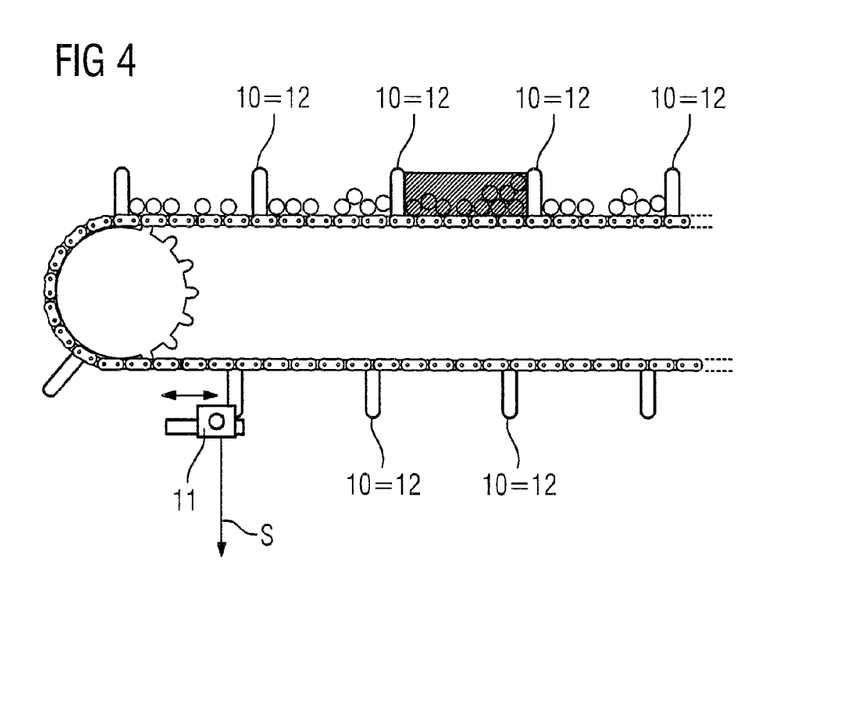
FIG. 4 is a side view of a section of the conveyor element of the conveyor device of FIG. 1.

There are several possible embodiments to ensure a correct triggering of the trigger signals S. For example and as shown in FIG. 4, trigger marks 10 may be positioned on the conveyor element 2 in equidistant intervals. Alternatively to an arrangement on the conveyor element 2 itself, the trigger marks 10 may be positioned on an auxiliary structure which moves together with the conveyor element 2. In case the trigger marks 10 are provided, the trigger device 3 comprises, as shown in FIG. 4, a sensor 11. The sensor 11 may be for example a proximity sensor. By means of the sensor 11 the presence of a trigger mark 10 at a predetermined location is detected. Each detection of the presence of a respective trigger mark 10 triggers a respective trigger signal S. The respective trigger signal S may be output by the trigger device 3 when—after the detection of the presence of a respective trigger mark 10—a predetermined delay time has expired. Preferably, however, the trigger signal S is output without waiting for the end of such a delay time, i.e. at once and immediately.

The sensor 11 may be positioned on a bracket (not shown in the drawings) in a fixed manner. Preferably, however, the sensor 11 is adjusted on the bracket in an adjustable manner. The adjustability may be particularly in the direction in which the trigger marks 10 are moved in the range of the sensor 11. This is indicated in FIG. 4 by a double arrow.

In a preferred embodiment of the present invention—see especially FIGS. 2, 3, and 4, further also FIG. 1—separators 12 are positioned on the conveyor element 2 in equidistant intervals. Alternatively to being positioned on the conveyor element 2 itself, the separators 12 may be positioned on an auxiliary structure which moves together with the conveyor element 2. It is possible and even preferred that the separators 12 are identical with the trigger marks 10. This is not necessarily the case, however. The separators 12 separate individual sections of the conveyor element 2 from each other. A single product 1 therefore is always completely in one section of the conveyor element 2, which is terminated by two separators 12. In the area of the separators 12 itself however there will be no product 1.

The positionings of the conveyor element 2 at which a respective image B is acquired and the size of the section of the conveyor element 2 are preferably matched to each other such that the respective section of the conveyor element 2 (as shown in FIG. 2) in conveying direction y is terminated on both sides by a separator 12. Furthermore, as shown in FIG. 2, there is preferably, seen in conveying direction y, no other separator 12 between the two separators 12 terminating the respective section. The distance of the separators 12 from each other corresponds in this case 1:1 with the distance of the trigger marks 10 or—more generally—the predetermined interval. Especially based on this relationship, the trigger marks 10 and the separators 12 may be the same elements.

Due to the regular sequence of the trigger marks 10 and the separators 12, however, the respective trigger mark 10 detected by the sensor 11 is not necessarily identical with one of the separators 12 terminating the section of the conveyor element 2 in the acquired image B.

The evaluated section of the images B may extend over the full width of the camera 4, i.e. over the full width of the acquired images B. In this case, the acquired images B, seen in conveying direction y, each correspond with one interval. Alternatively, there may be a predetermined area of the acquired images B which is evaluated. In this case, the width of the evaluated area of the acquired images B corresponds with one interval. Therefore, consecutive images B or consecutive evaluated areas of the images B border on each other without overlapping each other. This will be explained below in more detail with reference to FIG. 2 by giving a numerical example.

Let us assume that the images B detected by the camera 4 extend in conveying direction y over 2000 columns. As far as necessary, the columns are numerated in the following with 0 to 1999. Let us further assume that these 2000 columns correspond in reality with an extension of the conveyor element 2 in conveying direction y of 20 cm. Let us further assume that the length of the interval, seen in conveying direction y, is 15 cm. Based on the just stated assumptions, in order to achieve the result that sections of the conveyor element 2 consecutively border on each other without overlapping each other, per image B an image area of 1500 columns has to be evaluated.

Speaking generally, it is possible to define the width of this image area without further restriction. This is possible independently of the separators 12. If the separators 12 are provided, however, the separators 12 are in the detected images B always located at the same locations. For example, one of the separators 12 seen in conveying direction y is always located at the columns number 100 to 200 and the other of the separators 12 seen in conveying direction y is consequently always located at the columns number 1600 to 1700. In this case, there may—for example by a corresponding programming of the processing device 6—be defined that each image B is evaluated only between the columns number 150 to 1650 (or 100 to 1600 or 180 to 1680 or . . . ).

Figure 5:
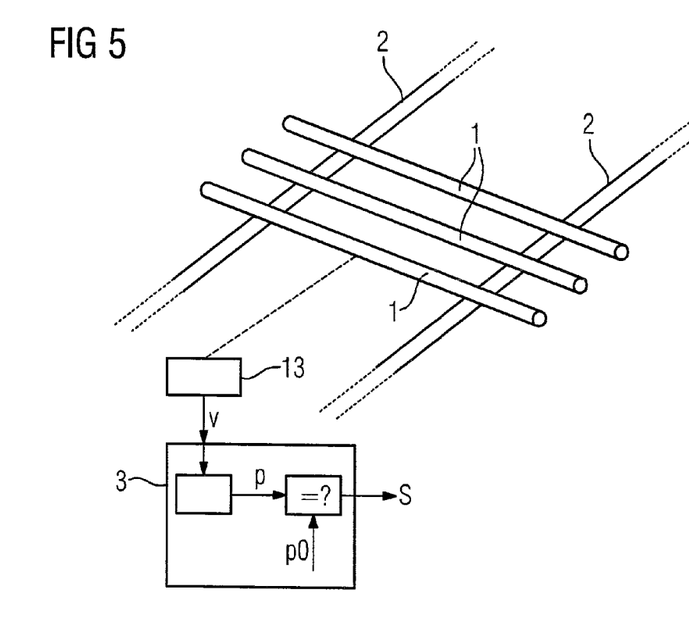
FIG. 5 shows a possible way for determining trigger times.

FIG. 5 shows an alternative embodiment for triggering the trigger signals S. As shown in FIG. 5, the conveyor device comprises a measuring device 13. The measuring device 13 continuously measures a conveying speed v of the conveyor element 2 conveying the bar-shaped products 1. The measuring device 13 may, for example, be designed as working in a contactless manner. An example of such a measuring device 13 is a laser measuring device which determines the conveying speed v by using the Doppler effect.

Figure 6:
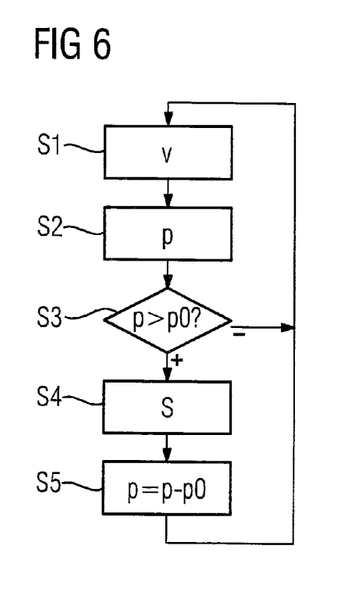
FIGS. 6 and 7 shows sequences of steps, FIGS. 8 to 12 each show a part of an image

The measured conveying speed v is provided to the trigger device 3. The trigger device 3 is connected to the measuring device 13 for this data transfer. As shown in FIG. 6, the trigger device 3 reads-in the measured conveying speed v in a step S1. Based on the measured conveying speed v, the trigger device 3 determines in a step S2 the respective positioning p of the conveyor element 2, for example by integrating the conveying speed v. In a step S3 the trigger device 3 checks whether the respective positioning p of the conveyor element 2 reaches or passes the size p0 of the interval. Each time the value p0 is reached or passed, the trigger device 3 in a step S4 outputs a trigger signal S. In a step S5 the positioning p is reduced by the value p0.

In the embodiment of FIG. 5, the value p0 and the size of the images B or the evaluated area of the images B are also matched to each other such that sections of the conveyor element 2 consecutively border on each other but do not overlap seen in conveying direction y.

In order to determine, based on the acquired images B, the number of conveyed products 1, several implementations are possible. In the following, there will be explained with reference to the FIGS. 7 to 12 first a possible implementation in which the images B are evaluated separately. This implementation is preferred if the separators 12 are provided. In some cases, this method is also applicable if the separators 12 are not provided. After this, with reference to FIG. 13 a second implementation in which the images B are evaluated in groups will be explained. This method is preferred if the separators 12 are not provided. Even if the separators 12 are provided, this method may be used, however. In this case the evaluation is executed for the respective image B, however. Further, in this case the separators 12 are removed from the respective images B prior to the evaluation of the respective image B.

Figure 7:
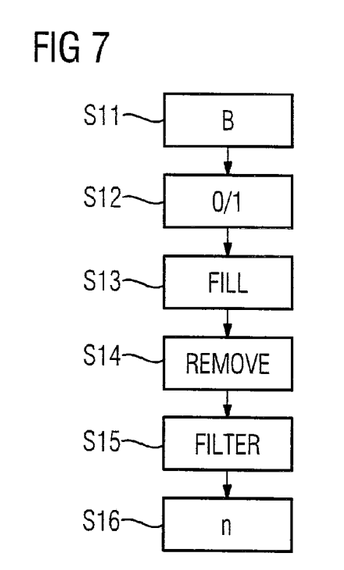

According to the method of FIG. 7, the processing device 6 accepts in a step S11 the respective acquired image B. If required, subsequent steps S12 to S16 are restricted to the relevant area of the acquired images B, for example—see the explanations above—to the columns number 150 to 1650.

Figure 8:
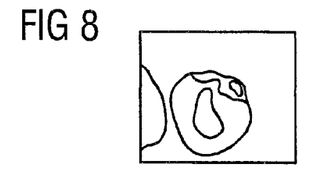
Figure 9:
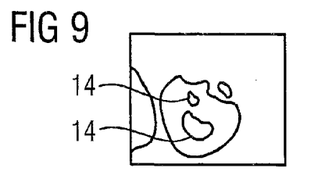

The acquired image B is binarized by the processing device 6 in a step S12. Consequently, in dependency on the respective grey value, each pixel is set either to 0 (dark pixel) or to 1 (bright pixel). Especially, the respective pixel is set to 0 if the grey value of the respective pixel is above a predetermined threshold. Otherwise, the respective pixel is set to 1. FIG. 8 shows a partial area of an image B prior to binarization, FIG. 9 the same partial area of the same image B after binarization.

Figure 10:
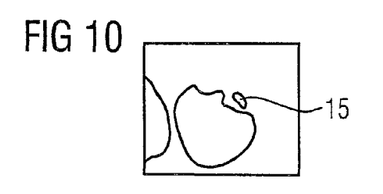

In a step S13 so-called dark holes 14 are filled by the processing device 6. Dark holes 14 are structures of dark pixels within the images B which are encircled completely by bright pixels. The step S13 may be restricted to dark holes 14 whose size remains below a first threshold. Alternatively, the step S13 may be executed independently of the size of the dark holes 14. FIG. 10 shows the partial area of the image B of FIGS. 8 and 9 after the filling of the dark holes 14.

Figure 11:
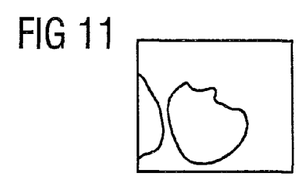

In a step S14 small structures 15 of bright pixels are removed by the processing device 6. Small structures 15 of bright pixels are structures whose number of contiguous bright pixels remains below a predetermined second threshold. FIG. 11 shows the partial area of the image B of FIGS. 8 to 10 after the removal of the small structures 15 of bright pixels.

Figure 12:
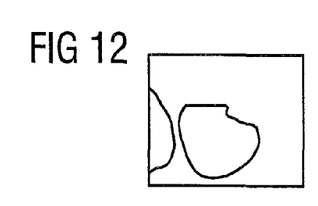

Optionally, further processing steps may be performed by processing device 6. For example, in a step S15 a kind of optical low-pass filtering may be implemented. For example, each dark pixel whose distance to the nearest bright pixel is less than a minimal distance is converted to a bright pixel. After that, each bright pixel whose distance to the nearest dark pixel is less than the same minimal distance is converted to a dark pixel. Alternatively, the inverse processing of these two steps is possible. FIG. 12 shows the partial area of the image B of FIGS. 8 to 11 after the optical lowpass filtering.

After executing the steps S11 to S14 or S15, respectively, the image B contains only so-called BLOBs 16 (BLOB=binary large object). Each BLOB 16 corresponds either with a single product 1 or with a plurality of products 1. As a final result, therefore, there may be determined by the processing device 6 in a step S16 for each image B a natural number n corresponding with the number of products 1 detected in the respective image B.

Figure 13:
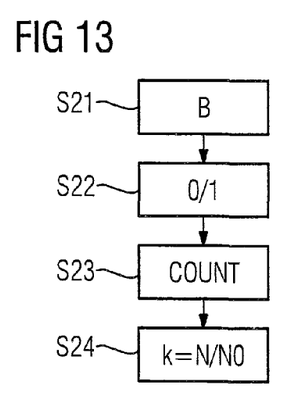
FIG. 13 shows a sequence of steps.

In the method of FIG. 13, the processing device 6 reads-in—as in the method of FIG. 7—in a step S21 the respective acquired image B. If required, subsequent steps S22 to S24 are restricted to the relevant area of the acquired images B, for example to the columns number 150 to 1650.

Furthermore, the acquired image B is binarized by the processing device 6 in a step S22. The explanations given with reference to step S12 of FIG. 7 are applicable.

After that, however, no further preparation of the images B is executed. Instead, in a step S23 simply the bright pixels are counted. The accumulated total of the counting—for example the number N—is divided in a step S24 by a standard number N0. The standard number N0 is the number of pixels which should be found for a single bar-shaped product 1. The resulting number k—i.e. the quotient k=N/N0—may be a rational number which not necessarily is a natural number.

The method of FIG. 13 may be executed individually for each image B. In this case, there may be determined for each image B a natural number n corresponding with the number n of products 1 detected in the respective image B. In this case, the determined number k will be rounded, rounded up or rounded down. Which of these processing methods is preferred, will depend on the circumstances of the special case. Preferably, however, the number n of products 1 is continued based upon the integer part of the determined number k. The residual part of the number k is preferably taken into account when determining the number k for the next image B. Especially, the residual part may be added to the quotient of the next image B.

In short, therefore, the present invention concerns the following subject matter:

A conveyor element 2 of a conveyor device conveys bar-shaped products 1 orthogonal to a longitudinal direction x of the bar-shaped products 1 in a conveying direction y. A trigger device 3 provides a trigger signal S each time the conveyor element 2 has traveled a predetermined interval. Based upon the respective trigger signal S, an image B is acquired by a camera 4, said image B showing front ends of the products 1 in a respective section of the conveyor element 2 corresponding at least to said predetermined interval. Based upon the acquired images B, the number of bar-shaped products 1 conveyed by the conveyor element 2 is determined.

The present invention has many advantages. Most importantly, it provides a reliable manner for counting the number of products 1 in a contactless way.

The present invention was explained above by a plurality of preferred embodiments. The present invention is, however, not restricted to these embodiments. Variations can be found easily by the person skilled in the art without deviating from the scope of the present invention.

LIST OF REFERENCE SIGNS 1 products
2 conveyor element
3 trigger device
4 camera
5 optical axis
6 processing device
7 light source
8 main illumination direction
9 filter
10 trigger marks
11 sensor
12 separators
13 measuring device
14 dark holes
15 small structures of bright pixels
B images
l length
L vertical lines
k number
n natural number
N number
N0 standard number
p positioning
p0 predetermined value
S trigger signal
S1 bis S24 steps
v conveying speed
x longitudinal direction
y conveying direction
α angle
α1, α2 partial angles

The invention claimed is:
1. A method of operation for a conveyor device for conveying bar-shaped products, wherein the bar shaped products have a longitudinal direction;
the method comprising:
conveying the bar-shaped products by a conveyor element of the conveyor device in a conveying direction orthogonal to the longitudinal direction of the bar-shaped products;
providing a respective trigger signal by a trigger device each time the conveyor element has travelled a predetermined interval;
acquiring an image by a camera based upon the respective trigger signal, the acquired image showing front ends of the products seen in a respective section of the conveyor element corresponding at least to the predetermined interval; and
determining the number of bar-shaped products conveyed by the conveyor element based upon the acquired images.

2. The method of operation according to claim 1, further comprising illuminating the front ends of the products in the respective section of the conveyor element by a light source.

3. The method of operation according to claim 2, wherein the light source emits light within a specified wavelength range, and the method further comprises filtering the light provided to the camera by a filter matched to the specified wavelength range.

4. The method of operation according to claim 3, wherein the light source emits red light.

5. The method of operation according to claim 1, further comprising continuously detecting and measuring a conveying speed of the conveyor element with a measuring device, providing the detected conveying speed to the trigger device, and issuing, by the trigger device, the trigger signals according to the detected conveying speed.

6. The method of operation according to claim 1, further comprising positioning trigger marks in equidistant intervals on the conveyor element or on an auxiliary structure which moves together with the conveyor element; and detecting the presence of a trigger mark by a sensor of the trigger device as the trigger mark moves past a predetermined location, wherein detection of presence of a respective trigger mark triggers outputting a respective trigger signal.

7. The method of operation according to claim 1, wherein separators are located and configured for separating groups of the products from each other, the separators are positioned at equidistant intervals on the conveyor element or on an auxiliary structure which moves together with the conveyor element, and the section of the conveyor element, seen in the conveying direction, is terminated on both longitudinal direction sides by a respective separator.

8. The method of operation according to claim 1, wherein the acquired images, seen in the conveying direction, each correspond with one interval or wherein within the acquired images a window is defined, and a width of the window, seen in the conveying direction, corresponds with one interval.

9. A conveyor device for conveying bar-shaped products, wherein the bar-shaped products have a longitudinal direction;

the conveyor device comprising:
a conveyor element configured and operable for conveying the bar-shaped products in a conveying direction orthogonal to the longitudinal direction of the bar-shaped products;
a trigger device configured and operable for providing a respective trigger signal each time the conveyor element has travelled a predetermined interval;
a camera acquiring an image, based upon the respective trigger signal, showing front ends of the products in a section of the conveyor element corresponding at least to the predetermined interval; and
a processing device located and configured for determining the number of bar-shaped products conveyed by the conveyor element, based upon the acquired images.

10. The conveyor device according to claim 9, further comprising a light source configured for illuminating the front ends of the products in the respective section of the conveyor element.

11. The conveyor device according to claim 10, wherein the light source emits light within a specified wavelength range, and the conveyor device further comprises a filter configured for filtering the light, wherein the filter is arranged in front of the camera, and the filter is matched to the specified wavelength range.

12. The conveyor device according to claim 11, wherein the light source is emitting red light.

13. The conveyor device according to claim 9, wherein the conveyor element is configured and operable for conveying the products at a conveying speed;
the conveyor device further comprises a measuring device for continuously measuring the conveying speed, the measuring device being connected to the trigger device for providing the measured conveying speed to the trigger device, and the trigger device being configured to issue the trigger signals according to the measured conveying speed.

14. The conveyor device according to claim 9, further comprising trigger marks positioned at equidistant intervals on the conveyor element or on an auxiliary structure which moves together with the conveyor element wherein:
the trigger device comprises a sensor for detecting the presence of a trigger mark, the trigger mark is at a predetermined location, and the sensor detecting the presence of a respective trigger mark triggers outputting a respective trigger signal.

15. The conveyor device according to claim 14, wherein the sensor has a mounting that is adjustable.

16. The conveyor device according to claim 9, further comprising separators located and configured for separating groups of the products from each other, the separators being positioned at equidistant intervals on the conveyor element or on an auxiliary structure which moves together with the conveyor element, the section of the conveyor element, seen in the conveying direction, being terminated on both longitudinal direction sides by a respective separator.

17. The conveyor device according to claim 9, wherein the acquired images, seen in the conveying direction, each corresponds with one interval or wherein a window is defined within the acquired images, wherein a width of the window, seen in the conveying direction, corresponds with one of the intervals.

* * * * *